Patented Nov. 9, 1926.

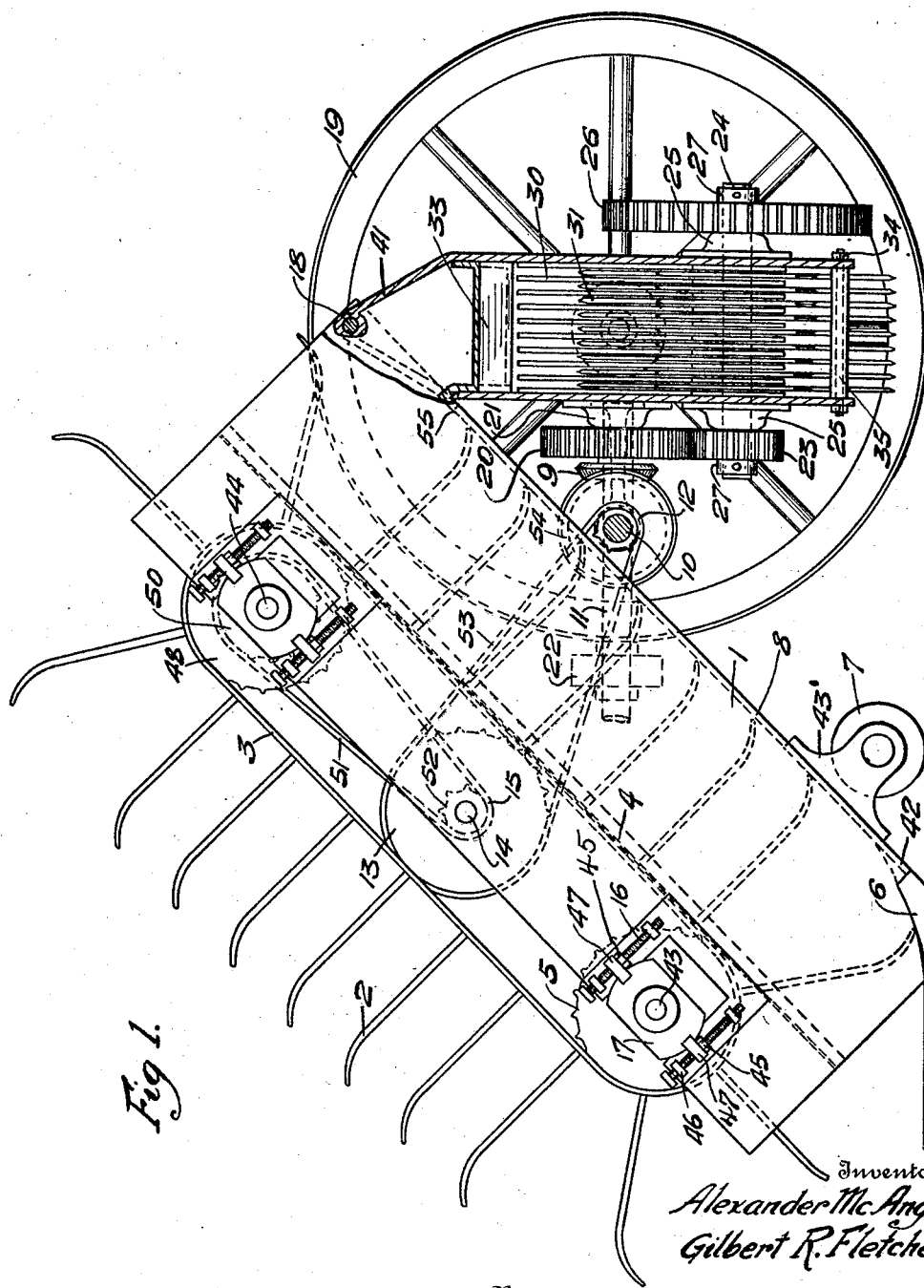

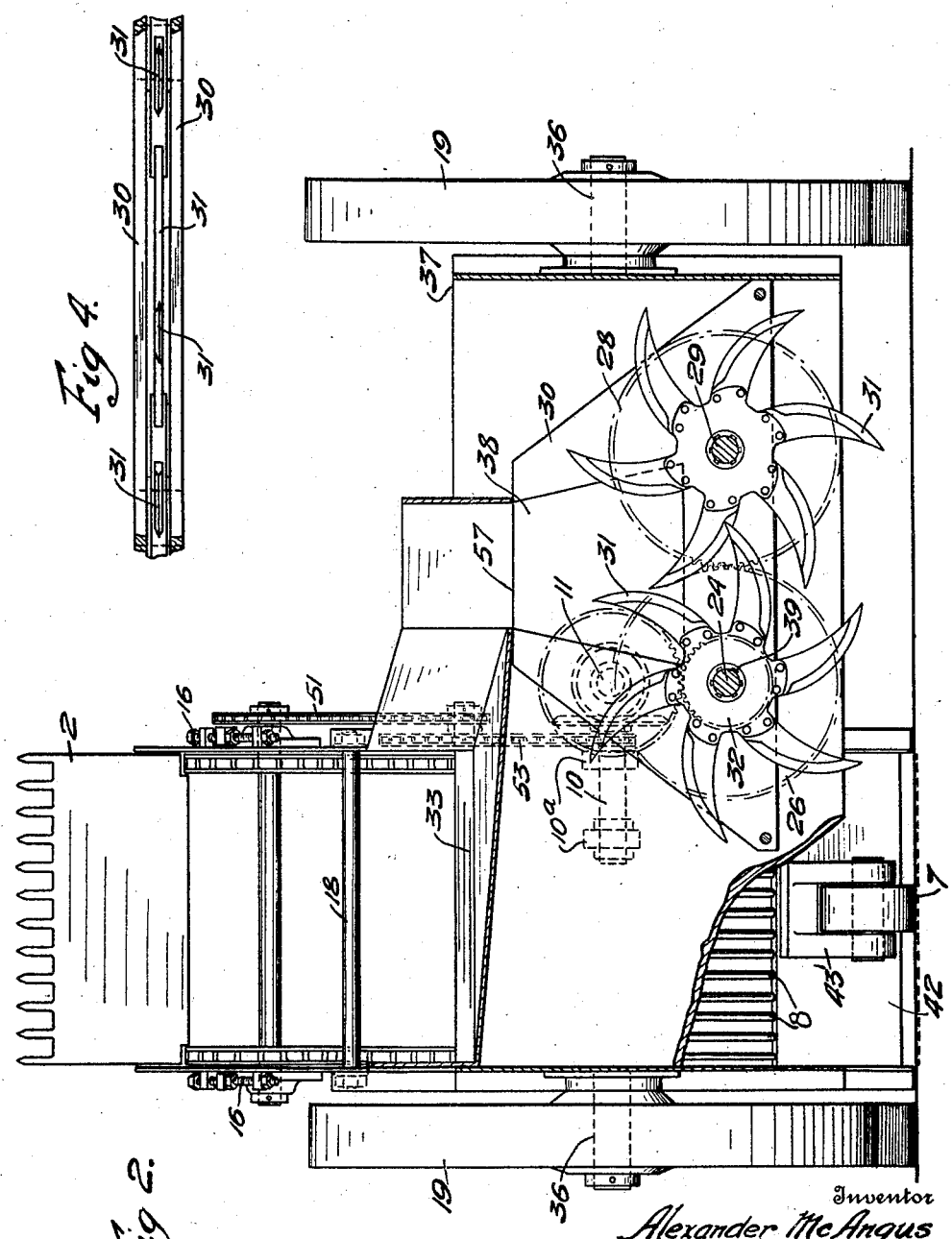

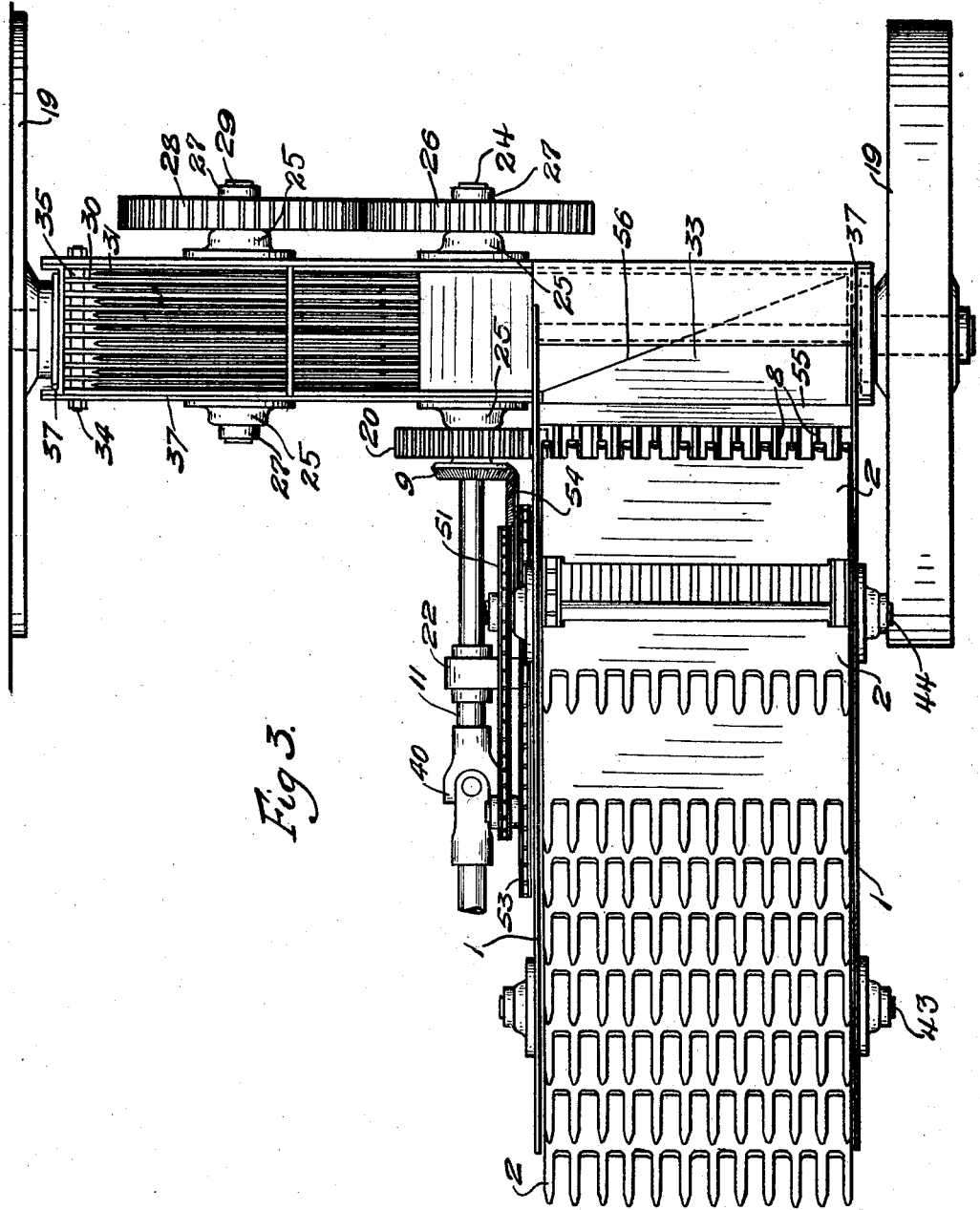

1,606,646

UNITED STATES PATENT OFFICE.

ALEXANDER McANGUS, OF HONOLULU, TERRITORY OF HAWAII, AND GILBERT R. FLETCHER, OF BERKELEY, CALIFORNIA.

AGRICULTURAL IMPLEMENT.

Application filed November 11, 1922. Serial No. 600,364.

This invention relates to agricultural implements and in particular to a device for removing the stumps of pineapple plants or similar vegetation from the soil, cutting the same into small pieces and distributing the cut product again to the soil as fertilizer.

The principal object of the invention is the provision of a device of the class mentioned which is designed to be driven by a tractor and to be supplied with power therefrom, said device being constructed in two units hingedly connected together in order to compensate for inequalities in the ground over which it is run, one unit consisting of a combined root digger and elevator and the other unit comprising a hopper furnished with cutting means and having facilities for permitting the spreading of the comminuted product upon the ground.

With the above and other objects in view, the invention consists in the improved agricultural implement illustrated in the accompanying drawings, described in the following specification, and particularly claimed, and in such variations and modifications thereof as will be obvious to those skilled in the art to which the invention relates.

In the drawings accompanying and forming a part of this specification, and wherein the preferred embodiment of my invention is illustrated:

Figure 1 is a side elevation of our improved stump remover, cutter and spreader.

Figure 2 is an end view of the same, partly in section.

Figure 3 is a plan view.

Figure 4 is a detail showing a plan view of portions of two of the knives.

Referring now in detail to the several figures, the numeral 19 represents a pair of vehicle wheels journalled upon stub axles 36 and by means of which the hopper frame 37 is supported. The latter comprises a rectangular box like structure, best shown in Figure 3, which is open at the bottom. This box like structure contains the cutting mechanism which comprises a series of plates 30 having the shape indicated in Figure 2, in which figure they are shown as provided with re-entrant trapezoidal cut-away recesses 38. Said plates are spaced apart a sufficient distance to permit the rotary knives 31 to operate between them by means of spacing rings 35 arranged upon bolts 34, extending through the side walls 37 of the hopper frame. A pair of shafts 24 and 29 extend transversely of the chamber of the hopper, and keyed upon each of the shafts is a hub 32. A plurality of knives 31 are secured in any suitable manner to each of the hubs 32 and extend radially from said hubs into the spaces between the plates 30. Each hub 32 and the plurality of knives 31 affixed thereto thus forms a rotary cutting device, and during the rotation of the shafts 24 and 29, a knife of each of the hubs 32 moves through the space between adjacent plates 30. In order to permit this, the knives are so arranged that the knife of one cutting device will lie in the angle formed between adjacent knives of the other cutting device while passing each other between the shafts 24 and 29. To make such an adjustment possible, the hubs 32 are each provided with a plurality of key-ways 39, anyone of which key-ways may receive the key upon the shaft on which the hub is mounted.

The shafts 24 and 29 are interconnected by means of the gears 26 and 28 which are secured to the projecting ends of said shafts externally of the hopper frame, as shown in Figure 3. One of the shafts, namely the shaft 24, is provided at its opposite end with a spur gear 23 as shown in Fig. 1, which meshes with a similar gear 20 secured to the main power shaft 11 of the implement. The shafts 24 and 29 are journalled in bearings 25 carried upon the outside of the hopper frame and retained in position by collars 27 affixed thereto externally of the gears. The power shaft 11 is journalled at one end in a bearing 21 mounted upon the hopper frame and adjacent its other end in a bearing 22 carried by the side 1 of the conveyer frame. A universal joint 40 on the end of the power shaft 11 affords means for connecting the latter to the power shaft of a tractor, not shown.

That end of the hopper frame which is laterally remote from the cutting device converges upwardly at 41 as shown in Figure 1, and affords a means for supporting the bolt 18 which functions as a hinge coupling between the hopper unit just described and the conveyor unit. The sides 1 of the latter are hingedly secured to the bolt 18 and extend in an inclined direction toward the ground as shown in Figure 1. Said sides are braced at their lower ends by means of a plate 42, shown in Figures 1 and 2, to which is secured a bracket 43 carrying the ground wheel 7. A plow point 6 projects from the lower edge of the brace 42, and when the ground wheel 7 rests upon the ground said plow point normally extends a short distance beneath the ground surface, its function being to uproot the pineapple plants. The object of the hinged connection between the conveyer unit and the hopper unit is to permit independence of movement between said units when the vehicle wheels 19 and the ground wheel 7 are passing over portions of ground of different elevation. A pair of shafts 43 and 44 are carried in adjustable bearing blocks 17 which are supported in recesses in the opposite sides of the conveyer frame by means of the bolts 16. The bolts 16 are held in parallel relation on each side of the bearing blocks by means of lugs 46 secured to the sides of the conveyer frame. Each bearing block 17 is furnished with lugs 47 which loosely surround the bolts 16 and may be adjusted for elevation by means of the nuts 45 which threadedly engage said bolts and can be advanced or retracted along said bolts. The shafts 43 and 44 carry sprockets 5 and 48 around which extends the conveyer chain 3. Said chain is driven through the sprocket 48 and the shaft 44 by means of a smaller sprocket 50 secured to said shaft. The sprocket 50 is connected by a chain 51 with a sprocket 52 on a shaft 14. The shaft 14 is provided with a sprocket 13 which is driven by a chain 53 from the sprocket 12 carried by a shaft 10 which extends transversely of the conveyor frame and below the latter. The shaft 10 carries a bevel gear 54 which meshes with the bevel gear 9 on the power shaft 11. It is of course understood that we have here described what we believe to be the preferred means for transmitting power from the tractor to the conveyer operating mechanism yet it is well within the scope of the invention to adopt any such power transmitting means as may be found necessary or expedient for the most efficient operation of the implement. A plurality of forks 2 are attached at regular intervals to the conveyer chain 3, preferably in such manner that they normally extend at right angles from the longitudinal stretches of said chain, and are of sufficient length to be carried in close relation to the ground for the purpose of sweeping the pineapple stumps upwardly from the plow point 6 toward the hopper. The floor of the conveyer above the plate 42 is formed of a number of spaced bars 8 between which stones and clods of earth may drop during the passage of the pineapple roots through a conveyer frame to the hopper. Thus foreign bodies, the introduction of which into the hopper might damage the cutting devices, are eliminated. The lower stretch of the conveyer chain 3 is prevented from sagging by being supported upon angle irons 4 which are secured to the inner faces of the sides 1 of the conveyer frame.

The bars 8 terminate a short distance below the point 55 in Figure 1, at which point a chute 33 is provided which bends angularly, as indicated at 56 in Figure 3, and enters the hopper at the point 57. Material elevated by the conveyer descends by gravity along said chute and drops into the hopper within the chamber formed by the recesses 38 in the plates 30. Here it is engaged by the rotating cutting devices which pass between the plates 30 and through said chamber thoroughly comminuting the pineapple roots and permitting the divided bits to drop by gravity through the interstices between the plates 30 upon the ground beneath. It will be observed that the cutting elements are arranged laterally of the digging elements and the conveyer, with respect to the direction in which the implement is designed to travel so that in the progress of the implement over the field the comminuted stumps are deposited upon the strip of ground from which the stumps were dug on the previous circuit of the implement through the field.

Although we have thus described the preferred embodiment of our invention, it is evident that those skilled in the art to which this relates may make various changes in the construction, combination and arrangement of the several parts without departing from the spirit and scope of the invention.

Having described our invention what we claim as new and desire to secure by Letters Patent, is:—

1. An agricultural vehicle comprising a pair of units each supported upon vehicle wheels, said units being hingedly connected along a transverse axis lying above the axes of rotation of said vehicle wheels, one of said units comprising digging and conveying means operable longitudinally of the direction of travel of said vehicle, and the other unit including cutting means operable by movement in planes transversely of the direction of movement of the vehicle.

2. An agricultural vehicle comprising a pair of units each supported upon vehicle wheels, said units being swivelly connected along a transverse axis lying above the axes of rotation of said vehicle wheels, one of said units comprising digging and conveying means operable longitudinally of the direction of travel of said vehicle, and the other unit including cutting means operable by movement in planes transversely of the direction of movement of the vehicle, said cutting means being off-set to one side of said digging and conveying means, 3. An agricultural vehicle comprising a pair of units each supported upon vehicle wheels, said units being hingedly connected along a transverse axis lying above the axes of rotation of said vehicle wheels, one of said units comprising digging and conveying means operable longitudinally in the direction of travel of said vehicle, the other unit including cutting means operable in planes transversely of the direction of movement of the vehicle, said cutting means being off-set to one side of the digging and conveying means and arranged to permit the discharge of comminuted material by gravity to the ground.

In testimony whereof, we have hereunto signed our names to this specification.

ALEXANDER McANGUS.
GILBERT R. FLETCHER.